Patented Aug. 7, 1934

1,968,906

UNITED STATES PATENT OFFICE 1,968,906

PRODUCTION OF ARYL MERCAPTO COMPOUNDS

Keith William Palmer, Fartown, Huddersfield, England, assignor to Imperial Chemical Industries Limited, a corporation of Great Britain No Drawing. Application July 2, 1932, Serial No. 620,732. In Great Britain July 6, 1931

9 Claims. (Cl. 260—154)

This invention relates to the production of aryl mercapto compounds and more particularly refers to the production of mercapto phenols.

It is an object of this invention to produce valuable organic compounds. A further object is to produce organic compounds which are very useful in dyeing processes. Additional objects will appear hereinafter.

These objects are attained by the present invention wherein a halogenated phenol is reacted with a mixture of alkali sulfide and alkali hydroxide.

The invention will be more completely understood by a consideration of the following examples, in which the quantities are stated in parts by weight:

Example 1

270 parts of crystallized sodium sulfide ($9H_2O$) and 40 parts of flake caustic soda were mixed and melted together at about 80° C. 128.5 parts of p-chlorophenol was added. The mixture was stirred and heated at 210–215° C. for 24 hours under a reflux condenser. The cooled mixture was dissolved in water and the solution was made acid by adding hydrochloric acid. The precipitated oil was separated and distilled under diminished pressure, giving almost pure monothiohydroquinone.

Example 2

93 parts of crystallized sodium sulfide ($9H_2O$), 14.5 parts of flake caustic soda, and 50 grams of 5-chloro-o-cresol were heated together as described in the preceding example. The new mercapto compound so-obtained had M. P. 42–43° C.

Example 3

520 parts of crystallized sodium sulfide ($9H_2O$), 80 parts of flake caustic soda, 258 parts of o-chlorophenol were heated together as described in preceding examples. The product, separated as there described, consisted of a mixture of monothiocatechol and unchanged o-chlorophenol. By fractional distillation the monothiocatechol was obtained as a colorless oil of B. P. 134–136° C. at 65 mm. pressure.

In the above examples other halogen groups may be substituted for the chloro groups and likewise, other alkyl groups may be substituted for the methyl group used in Example 2. Also various other groups, well known to one skilled in the art, which do not enter into the reaction but which produce substituted mercapto phenols as a product may be used in carrying out the process of the present invention without departing from the scope thereof.

The reactions herein described probably proceed according to the following equations:

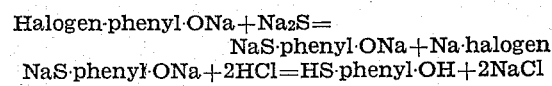

$NaS \cdot phenyl \cdot ONa + 2HCl = HS \cdot phenyl \cdot OH + 2NaCl$

As many apparently widely different embodiments of this invention may be made without departing from the spirit and scope thereof, it is to be understood that I do not limit myself to the specific embodiments thereof except as defined in the appended claims.

I claim:

1. A process which comprises reacting a halogenated phenol with a molten mixture of an alkali metal sulfide and an alkali metal hydroxide.

2. A process which comprises reacting an alkyl halogeno phenol with a molten mixture of an alkali metal sulfide and an alkali metal hydroxide.

3. A process which comprises reacting a halogenated phenol with a molten mixture of sodium sulfide and sodium hydroxide.

4. A process which comprises reacting an alkyl halogeno phenol with a molten mixture of sodium sulfide and sodium hydroxide.

5. A process which comprises reacting p-chlorophenol with a molten mixture of sodium sulfide and sodium hydroxide.

6. A process which comprises reacting 5-chloro-o-cresol with a molten mixture of sodium sulfide and sodium hydroxide.

7. A process which comprises reacting o-chlorophenol with a molten mixture of sodium sulfide and sodium hydroxide.

8. The product having the following general formula:

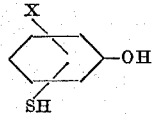

in which X represents an alkyl group.

9. The product having the following general formula:

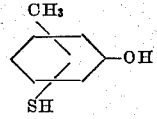

and having a melting point of about 42° C. to about 43° C.

KEITH WILLIAM PALMER.